(12) United States Patent
Jones et al.

(10) Patent No.: US 11,691,345 B2
(45) Date of Patent: Jul. 4, 2023

(54) SYSTEMS AND METHODS FOR TOOL-LESS MANUFACTURING OF THERMOPLASTIC PARTS

(71) Applicant: General Atomics Aeronautical Systems, Inc., San Diego, CA (US)

(72) Inventors: Adam Jason Jones, Lucerne Valley, CA (US); Paul Edward Sherman, Wrightwood, CA (US); John Angely Geriguis, Wrightwood, CA (US)

(73) Assignee: General Atomics Aeronautical Systems, Inc., San Diego, CA (US)

( * ) Notice: Subject to any disclaimer, the term of this patent is extended or adjusted under 35 U.S.C. 154(b) by 76 days.

(21) Appl. No.: 17/212,711

(22) Filed: Mar. 25, 2021

(65) Prior Publication Data

US 2021/0206117 A1 Jul. 8, 2021

Related U.S. Application Data

(62) Division of application No. 15/905,776, filed on Feb. 26, 2018, now Pat. No. 10,987,871.

(Continued)

(51) Int. Cl.
*B29C 64/393* (2017.01)
*B29C 64/118* (2017.01)
(Continued)

(52) U.S. Cl.
CPC .......... *B29C 64/393* (2017.08); *B29C 64/106* (2017.08); *B29C 64/118* (2017.08); *B29C 64/209* (2017.08); *B29C 64/40* (2017.08); *B33Y 10/00* (2014.12); *B33Y 30/00* (2014.12); *B33Y 50/02* (2014.12)

(58) Field of Classification Search
CPC .............................. B29C 64/40; B29C 64/118
See application file for complete search history.

(56) References Cited

U.S. PATENT DOCUMENTS

| 4,679,291 A | 7/1987 | Schmeal |
| 4,907,754 A | 3/1990 | Vaniglia |
| (Continued) | | |

FOREIGN PATENT DOCUMENTS

WO 2015073322 5/2015

OTHER PUBLICATIONS

Atkinson et al; "Robotic Drilling System for 737 Aileron"; 2007-01-3821; 2007 SAE International.

(Continued)

*Primary Examiner* — Kelly M Gambetta
*Assistant Examiner* — Virak Nguon
(74) *Attorney, Agent, or Firm* — Fitch, Even, Tabin & Flannery LLP

(57) ABSTRACT

A system for manufacturing a thermoplastic object may include a robotic arm configured to dispense thermoplastic material, a support apparatus, a computing device and an imaging system. The imaging system may scan thermoplastic material dispensed by the first robotic arm and create a three-dimensional scan model. The model may be compared to a computer model profile to determine if the dispensed material requires adjustment. If the dispensed material requires adjustment, the computing device may adjust the robotic arm or the support apparatus.

19 Claims, 10 Drawing Sheets

Related U.S. Application Data

(60) Provisional application No. 62/468,899, filed on Mar. 8, 2017.

(51) Int. Cl.
*B29C 64/209* (2017.01)
*B33Y 50/02* (2015.01)
*B33Y 10/00* (2015.01)
*B33Y 30/00* (2015.01)
*B29C 64/40* (2017.01)
*B29C 64/106* (2017.01)

(56) References Cited

U.S. PATENT DOCUMENTS

| | | |
|---|---|---|
| 6,495,091 B1 | 12/2002 | Manson |
| 8,070,473 B2 | 12/2011 | Kozlak |
| 8,295,978 B2 | 10/2012 | Cho |
| 2015/0177194 A1 | 6/2015 | Xu |
| 2015/0266284 A1 | 9/2015 | Oldani |
| 2016/0082673 A1 | 3/2016 | Schibsbye |
| 2016/0176123 A1 | 6/2016 | Pedigo |
| 2017/0232679 A1 | 8/2017 | Gardiner |
| 2018/0117841 A1 | 5/2018 | Tyler |
| 2018/0126643 A1 | 5/2018 | Tyler |
| 2018/0257305 A1 | 9/2018 | Jones |
| 2018/0361729 A1 | 12/2018 | Gibson |
| 2019/0009472 A1* | 1/2019 | Mark ................ B33Y 10/00 |

OTHER PUBLICATIONS

Jones et al; U.S. Appl. No. 15/905,776, filed Feb. 26, 2018.
USPTO; Non-Final Office Action issued in U.S. Appl. No. 15/905,776 dated Jun. 10, 2020.
USPTO; Notice of Allowance issued in U.S. Appl. No. 15/905,776 dated Dec. 31, 2020.
USPTO; Restriction Requirement issued in U.S. Appl. No. 15/905,776 dated Mar. 17, 2020.

* cited by examiner

SYSTEMS AND METHODS FOR TOOL-LESS MANUFACTURING OF THERMOPLASTIC PARTS

CROSS REFERENCES

This application is a divisional of U.S. application Ser. No. 15/905,776, filed Feb. 26, 2018, for SYSTEMS AND METHODS FOR TOOL-LESS MANUFACTURING OF THERMOPLASTIC PARTS, which claims the benefit of U.S. Provisional Application No. 62/468,899, filed Mar. 8, 2017, entitled SYSTEMS AND METHODS FOR TOOL-LESS MANUFACTURING OF THERMOPLASTIC PARTS, both of which are incorporated in their entirety herein by reference.

BACKGROUND OF THE INVENTION

1. Field of the Invention

The present invention relates generally to manufacturing thermoplastics, and more specifically to automated manufacturing of thermoplastic parts.

2. Discussion of the Related Art

Various systems and processes are known in the art for automated manufacturing of thermoplastic parts. Various manufacturing systems and processes are known in the art for rapidly producing prototypes made of polymeric materials. Three-dimensional jet printing is one of these. While these processes are useful to produce prototypes used for conducting engineering and marketing studies, the prototype systems and processes currently known in the art are not capable of producing full sized, structural components capable of realistic load-bearing performance in service.

Producing large, full sized, fiber-reinforced laminates such as an aircraft wing, fuselage, control surfaces, a ship hull or a wind blade relies on process designs that require forming tools. These tools may range from carved foam to composite laminates to permanent tools made of metal. Even the quickest and cheapest of forming tools require time and expense to design and produce. When complete, forming tools may quickly be obsolete because of the need to iterate and advance the product design.

The use of forming tools is a major pacing element limiting product development and evolution. If means could be devised to obviate the reliance on such tools, product development could proceed at a much faster pace, while maintaining flexibility, quality, affordability and accuracy.

SUMMARY

A system for manufacturing a thermoplastic object may include a robotic arm configured to dispense thermoplastic material, a support apparatus, a computing device and an imaging system. The imaging system may scan thermoplastic material dispensed by the first robotic arm and create a three-dimensional scan model. The model may be compared to a computer model profile to determine if the dispensed material requires adjustment. If the dispensed material requires adjustment, the computing device may adjust the robotic arm or the support apparatus.

In one embodiment, a method may include dispensing thermoplastic material, from a dispensing device, in three dimensions according to a three-dimensional computer model having a three-dimensional computer model profile, wherein the dispensed thermoplastic material is supported by at least one support point of a support apparatus, repeatedly optically scanning the thermoplastic material during dispensing, creating, after each scan, a three-dimensional scan model of the dispensed thermoplastic material, the scan including a three-dimensional dispensed material profile, comparing, after each scan, the dispensed material profile to the computer model profile, determining, after each scan, if the dispensing of the thermoplastic material requires coordinate adjustment in order for the dispensed material profile to match the computer model profile within pre-determined engineering tolerances, and adjusting, upon determining that the dispensed material requires adjustment, of at least one of the coordinate location of the dispensed material and the coordinate location of the support point, whereby the dispensed material profile is adjusted to match the computer model profile within a pre-determined tolerance.

In another embodiment, a system for manufacturing thermoplastics may comprise a first robotic arm configured to dispense thermoplastic material in three-dimensional space to create an object based on an object computer model having a three-dimensional computer model profile; a support apparatus including at least one support point for the dispensed thermoplastic material, the at least one support point movable in at least one dimension; a computing device coupled to and configured to operate the dispensing device and the support apparatus to create the object; and an imaging system coupled to the computing device and configured to optically scan objects and produce digital three-dimensional profiles, wherein during dispensing the thermoplastic material to create the object, wherein the system is configured to: dispense the thermoplastic material, from a dispensing device, in three dimensions according to a three-dimensional computer model having a three-dimensional computer model profile, wherein the dispensed thermoplastic material is supported by at least one support point of a support apparatus; repeatedly optically scan the thermoplastic material during dispensing; create, after each scan, a three-dimensional scan model of the dispensed thermoplastic material, the scan including a three-dimensional dispensed material profile; compare, after each scan, the dispensed material profile to the computer model profile; determine, after each scan, if the dispensing of the thermoplastic material requires coordinate adjustment in order for the dispensed material profile to match the computer model profile within pre-determined engineering tolerances; and adjust, upon determining that the dispensed material requires adjustment, of at least one of the coordinate location of the dispensed material and the coordinate location of the support point, whereby the dispensed material profile is adjusted to match the computer model profile within a pre-determined tolerance.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

A system for manufacturing a thermoplastic object may include a robotic arm configured to dispense thermoplastic material, a support apparatus, a computing device and an imaging system. The imaging system may scan thermoplastic material dispensed by the first robotic arm and create a three-dimensional scan model. The model may be compared to a computer model profile to determine if the dispensed material requires adjustment. If the dispensed material requires adjustment, the computing device may adjust the robotic arm or the support apparatus.

Figure 1:
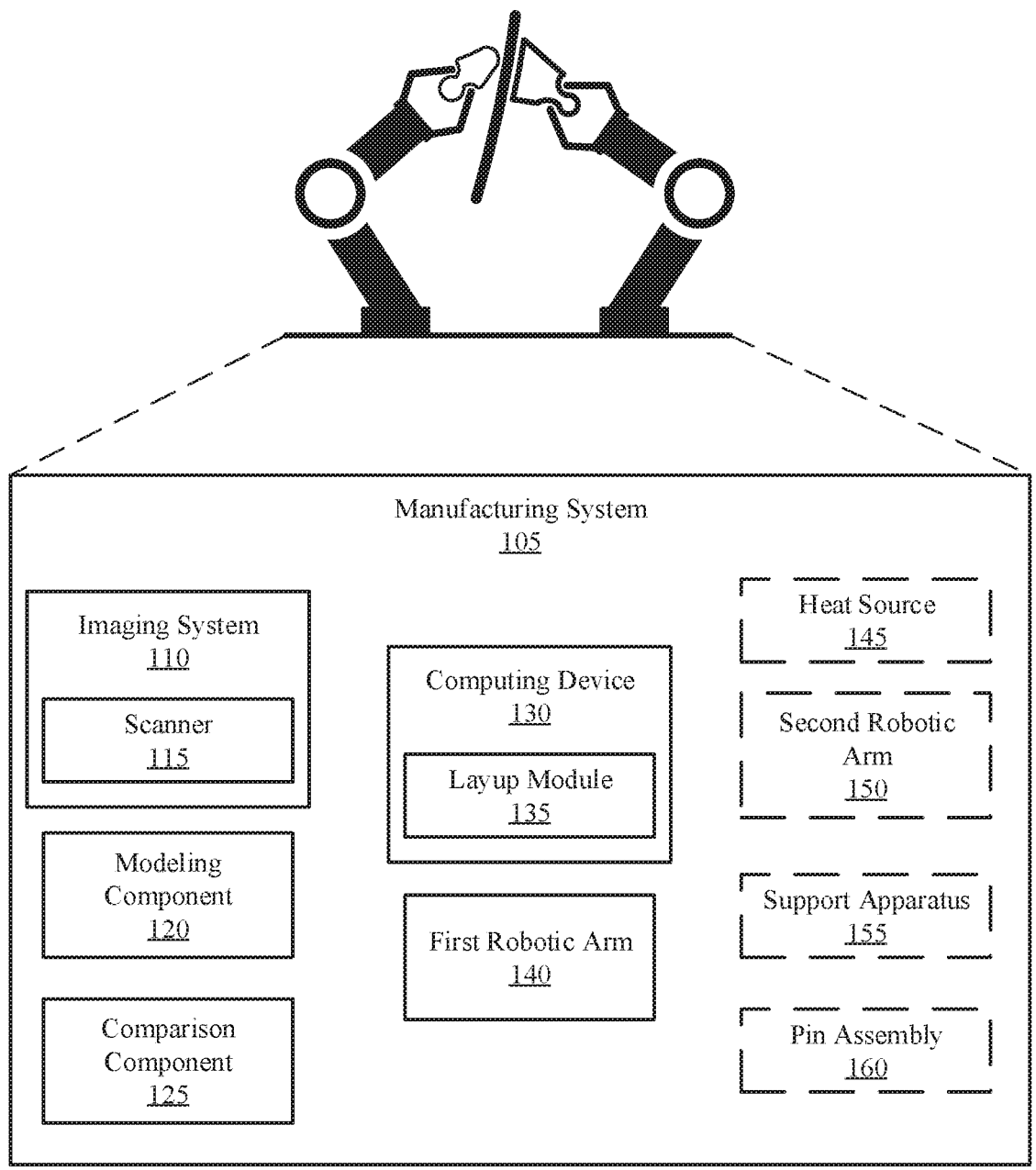
FIG. 1 illustrates an example of a manufacturing system that supports automated manufacturing of thermoplastic parts in accordance with aspects of the present disclosure.

FIG. 1 illustrates an example of a manufacturing system 105 that supports automated manufacturing of thermoplastic parts in accordance with aspects of the present disclosure. Manufacturing system 105 may be an example of, or incorporate aspects of, manufacturing system 205, 305, and 405 as described with reference to FIGS. 2, 3, and 4.

In some examples, manufacturing system 105 may include imaging system 110, modeling component 120, comparison component 125, computing device 130, and first robotic arm 140. In some examples, manufacturing system 105 may also include any combination of heat source 145, second robotic arm 150, support apparatus 155, and pin assembly 160.

Imaging system 110 may be an example of, or incorporate aspects of, imaging system 210, 310, and 410 as described with reference to FIGS. 2, 3, and 4. In some examples, imaging system 110 may include scanner 115.

Imaging system 110 may continually optically scan the dispensed thermoplastic material; repeatedly optically scan the thermoplastic material during dispensing; repeatedly optically scan the dispensed thermoplastic material by an imaging system 110 during dispensing of the thermoplastic material; and take of a final scan by the imaging device in response to determining that the object is complete.

In some cases, the imaging system 110 further comprises a Rapid Virtual Assembly Tooling 3-D scanning system. In some cases, the continually optically scanning includes continually taking photographs. In some cases, the continually optically scanning includes continuously taking video. In some cases, the thermoplastic material is one of polyetheretherketone, polyetherketoneketone, and polyethersulfone.

Modeling component 120 may repeatedly create a three-dimensional scan model of the dispensed thermoplastic material from the continual optical scanning, the scan model including a three-dimensional dispensed material profile; create, after each scan, a three-dimensional scan model of the dispensed thermoplastic material, the scan including a three-dimensional dispensed material profile; and continually create a model from the optical scanning during the dispensing of the thermoplastic material.

In some cases, the three-dimensional model is generated by a layup module 135 configured to run on a computing device 130, wherein the computing device 130 is configured to control the dispensing device. In some cases, the creating of the model includes converting data from the optical scan into digital form.

Comparison component 125 may compare, after each scan or after the creation of each scan model, the dispensed material profile to the computer model profile and send each comparison to the computing device 130.

In some cases, the comparing of the dispensed material profile to the computer model profile includes identifying a plurality of designated profile locations on the computer model profile and corresponding profile locations on the dispensed material profile, wherein each designated profile location is compared to the corresponding dispensed material profile location.

In some cases, the comparison of each designated profile location with the corresponding dispensed material profile location is a delta point, wherein the delta point indicates a coordinate distance between the designated profile location and the corresponding dispensed material profile location.

In some cases, the comparing by the imaging system 110 of the model with the three-dimensional shape includes generating of data including differences between the model and the three-dimensional shape at various points on a surface of the object.

Computing device 130 may be an example of, or incorporate aspects of, computing device 215, 315, and 415 as described with reference to FIGS. 2, 3, and 4. In some examples, computing device 130 may include layup module 135.

Computing device 130 may determine, after each scan or after the creation of each scan model, if the dispensed material requires adjustment for the dispensed material profile to match the computer model profile within predetermined engineering tolerances; and adjust, upon determining that the dispensed material requires adjustment, at least one of the dispensing device and at least one of the at least one support point, whereby the dispensed material profile is adjusted to match the computer model profile within the pre-determined engineering tolerances.

Computing device 130 may also determine a three-dimensional shape and specifications of the object using a layup module 135 running on a computing device 130.

Computing device 130 may also control a dispensing device to dispense thermoplastic material, whereby the dispensing device dispenses the material in three dimensions to create the object; simultaneously control, during a first stage of dispensing of the thermoplastic material, a support apparatus 155, whereby the support apparatus 155 is moveable in three dimensions to support the dispensed material; and adjust, in response to each comparing during the first stage, of at least one of the dispensing device and the support apparatus 155.

Computing device 130 may also determine if the first stage is complete; control, in response to determining that the first stage is complete, of a pin assembly 160 to support the object; determine if the object is complete; and determine, using the final scan, if the completed object falls within acceptable parameters.

In some cases, the computing device 130 further includes a layup module 135 configured to run on the computing device 130 to control the dispensing device. In some cases, the computing device 130 is configured dispense or control the dispensing of thermoplastic material to prevent internal stresses. In some cases, the thermoplastic material is one of polyetheretherketone, polyetherketoneketone, and polyethersulfone.

First robotic arm 140 may be an example of, or incorporate aspects of, first robotic arm 220, 320, 420, 505, and 605 as described with reference to FIGS. 2, 3, 4, 5, and 6. In some cases, the first robotic arm 140 is coupled to a track such that the dispensing device is moveable on the track. In some cases, the first robotic arm 140 is coupled to a track such that the first robotic arm 140 is moveable on the track.

Second robotic arm 150 may be an example of, or incorporate aspects of, second robotic arm 225, 510, and 610 as described with reference to FIGS. 2, 5, and 6. In some cases, the free end of the second robotic arm 150 includes a support surface, wherein the at least one support point of the support apparatus 155 is included in the support surface. In some cases, the support surface is configured to provide a mold for the thermoplastic object. In some cases, the second robotic arm 150 is coupled to a track such that the second robotic arm 150 is moveable on the track.

Support apparatus 155 may provide at least one additional support point located at a position on the three-dimensional profile using a truss picture frame support and provide at least one additional support point located at a position outside the three-dimensional profile of the object using a truss picture frame structure.

In some cases, the support apparatus 155 comprises a second robotic arm 150 with a free end configured to move in three-dimensional space, wherein the second robotic arm 150 is coupled to and controlled by the computing device 130, whereby the at least one support point is repeatedly moved such that the support point is maintained in a location relative to the dispensed thermoplastic material to produce the object with the computer model three-dimensional profile.

In some cases, the support apparatus 155 comprises the pin assembly 160, comprising a plurality of generally horizontal pins coupled to a fixed support structure, each pin configured to provide at least one of removable support and deformation to the object during manufacture.

In some cases, the support apparatus 155 comprises a truss picture frame support providing at least one additional support point located at a position on the three-dimensional profile. In some cases, the truss picture frame structure is fixed in place during the object manufacture. In some cases, the truss picture frame structure is moveable during the object manufacture.

In some cases, the support apparatus 155 comprises a truss picture frame structure providing at least one additional support point located at a position outside the three-dimensional profile of the object. In some cases, the support apparatus 155 comprises a support robotic arm with a free end configured to move in three-dimensional space, wherein the support robotic arm is coordinated with the dispensing device, whereby the at least one support point is repeatedly moved such that the support point is maintained in a location relative to the dispensed thermoplastic material to produce the object with the computer model three-dimensional profile.

In some cases, the free end of the support robotic arm includes a support surface, wherein the at least one support point of the support apparatus 155 is included in the support surface. In some cases, the support surface is configured to provide a mold for the thermoplastic object.

In some cases, the support apparatus 155 comprises pin assembly 160, comprising a plurality of generally horizontal pins coupled to a fixed support structure, each pin configured to provide at least one of removable support and deformation to the object during manufacture. In some cases, the truss picture frame structure is fixed in place during the object manufacture. In some cases, the truss picture frame structure is moveable during the object manufacture.

Pin assembly 160 may be an example of, or incorporate aspects of, pin assembly 325 and 425 as described with reference to FIGS. 3 and 4.

Heat source 145 may apply heat to the dispensed thermoplastic material during dispensing the thermoplastic material to create the object, whereby internal stresses of the dispensed thermoplastic material are relieved, and wherein a heat source 145 for the heat is coupled to and operatively controlled by the computing device 130 and apply heat to the dispensed thermoplastic material during dispensing the thermoplastic material to create the object, whereby internal stresses of the dispensed thermoplastic material are relieved. In some cases, heat source 145 may be a component of the first robotic arm 140.

In some cases, the first robotic arm 140 and a dispensing device may be collocated or may refer to the same component. Thus, the first robotic arm 140 may be configured to dispense thermoplastic material in three-dimensional space to create an object based on an object computer model having a three-dimensional computer model profile. The support apparatus 155 and the second robotic arm 150 may be collocated, or may refer to the same component.

The support apparatus 155 may include at least one support point for the dispensed thermoplastic material, the at least one support point movable in at least one dimension. The computing device 130 may be coupled to and configured to operate the dispensing device and the support apparatus 155 to create the object. The imaging system 110 may be coupled to the computing device 130 and may be configured to optically scan objects and produce digital three-dimensional profiles.

The layup module 135 may include hardware and software as required to send instructions to the first robotic arm 140, second robotic arm 150, and pin assembly 160, based on both the initial object parameters loaded into the module and the data received from the imaging system 110. The imaging system 110 may include 3-D scanner 115 and a Rapid Virtual Assembly Tooling (RVAT) system and may be coupled to and in communication with the computing device 130.

Figure 2:
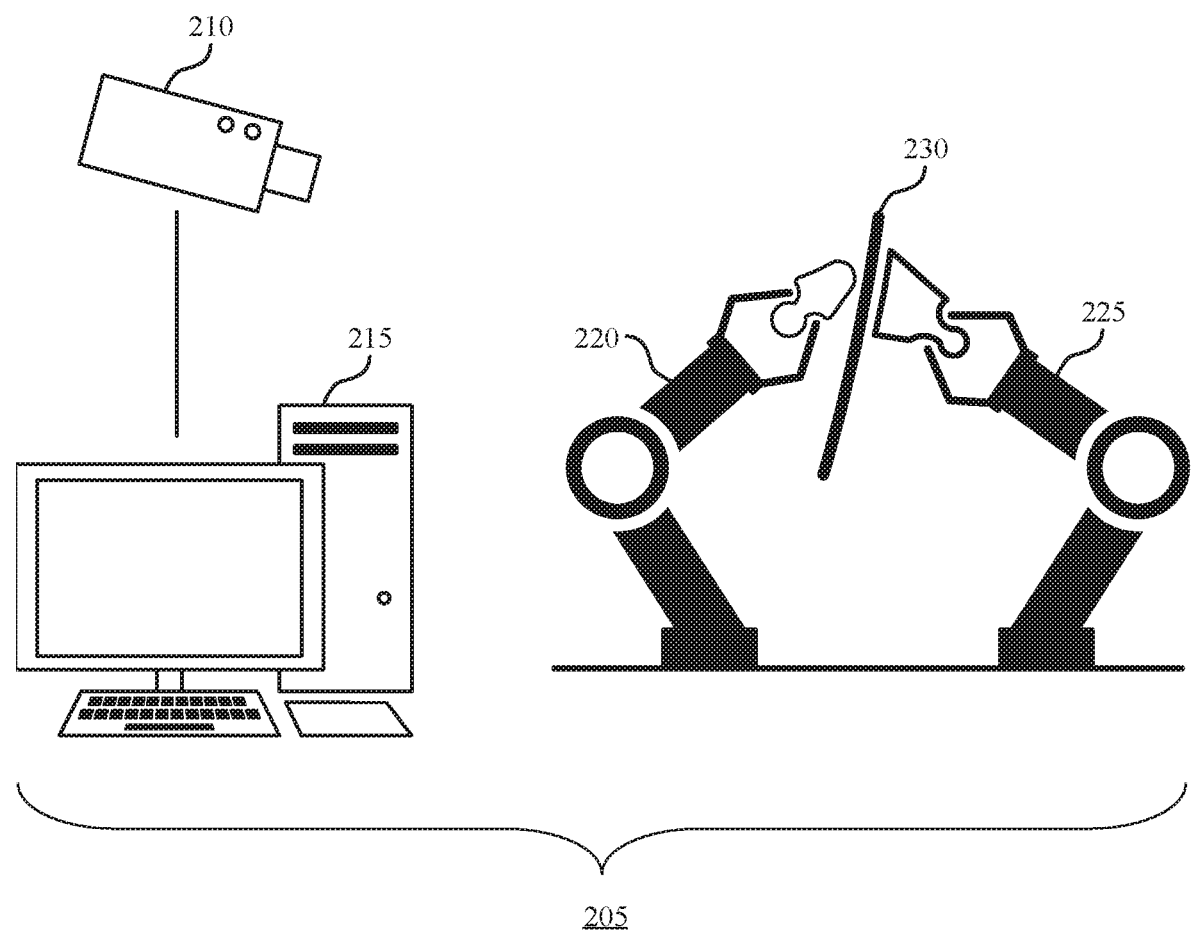
FIG. 2 illustrates an example of a manufacturing system with two robotic arms that supports automated manufacturing of thermoplastic parts in accordance with aspects of the present disclosure.

FIG. 2 illustrates an example of a manufacturing system 205 with two robotic arms that supports automated manufacturing of thermoplastic parts in accordance with aspects of the present disclosure. FIG. 2 includes illustrations of manufacturing system 205 and object 230.

Manufacturing system 205 may be an example of, or incorporate aspects of, manufacturing system 105, 305, and 405 as described with reference to FIGS. 1, 3, and 4. In some examples, manufacturing system 205 may include imaging system 210, computing device 215, first robotic arm 220, and second robotic arm 225.

Imaging system 210 may be an example of, or incorporate aspects of, imaging system 110, 310, and 410 as described with reference to FIGS. 1, 3, and 4.

Computing device 215 may be an example of, or incorporate aspects of, computing device 130, 315, and 415 as described with reference to FIGS. 1, 3, and 4.

First robotic arm 220 may be an example of, or incorporate aspects of, first robotic arm 140, 320, 420, 505, and 605 as described with reference to FIGS. 1, 3, 4, 5, and 6.

Second robotic arm 225 may be an example of, or incorporate aspects of, second robotic arm 150, 510, and 610 as described with reference to FIGS. 1, 5, and 6.

Object 230 may be an example of, or incorporate aspects of, object 335, 430, 535 and 635 as described with reference to FIGS. 3, 4, 5, and 6.

The first robotic arm 220 may be configured to fuse ribbons or bundles of thermoplastics in three-dimensional space to produce a structure. Examples of these types of robotic arms are known in the art. One example is a Modular Head Advanced Fiber Placement machine. As shown in FIG. 1, the object 230 is being created by the first robotic arm 220 as controlled by the computing device 215 coupled to the first robotic arm 220.

In some cases, the computing device 215 includes software configured to run on the computing device 215, whereby an object 230 computer model of the desired object 230 is received by software of the computing device 215, in the present embodiment the layup module, (in some embodiments either imported from a CAD program or input directly into the software) and the software controls the first robotic arm 220 to result in the finished object 230 profile matching that of the original object 230 computer model.

In one embodiment, the robotic arm is configured to position, consolidate, and fuse ribbons or bundles of thermoplastic material. The thermoplastic material can be reinforced (e.g. with fibers) or unreinforced. Examples of thermoplastics suitable for these systems and methods include polyetheretherketone (PEEK), polyetherketoneketone (PEKK), and polyethersulfone (PES). Various heating and cooling processes may be included in the placement process.

In one embodiment, instantaneous heating and/or cooling processes are used. For example, electric, flame, or laser heating is used to apply energy to soften and bond reinforced ribbons at precise locations and for short durations. The heating process is variable and programmable to account for variations in the intended object 230 design.

The second robotic arm 225 is one embodiment or one component of a support apparatus for the dispensed thermoplastic material. The second robotic arm 225 is located generally in a mirror image position to the first robotic arm 220. The end of the second robotic arm 225 is configured to provide an "anvil" configured to move in three dimensions and including a surface for receiving the thermoplastic material immediately after being dispensed by the first robotic arm 220. The anvil acts as a support and a mold for the dispensed material.

The first robotic arm 220 and the second robotic arm 225 may be controlled by the computing device 215 such that the anvil is in the proper location relative to the first robotic arm 220 to produce the desired three-dimensional profile of the structure/object 230 being produced. The three-dimensional profile has been previously defined and is used by the computing device 215 to produce the object 230.

The first robotic arm 220 and the second robotic arm 225 may be on a movable track or gantry to allow for additional horizontal and/or vertical movement.

The imaging system 210 includes a 3-D optical scanner capable of capturing an image of a physical part located in a fixed 3-D space, in this case the object 230 under production, and transferring it into a computer generated image, with all of the dimensions and features of the object 230 represented as a digital computer model. The imaging system 210 is coupled to and in communication with the computing device 215.

In one embodiment, the scanner is a RVAT 3-D scanning system. The RVAT 3-D scanning system may include software and hardware configured for scanning and analysis in real-time as the physical part is moving in space or changing in size, i.e. "growing". In one embodiment the RVAT 3-D scanning system is a PONTOS live system.

As the physical object 230 is tracked by the 3-D scanner, the profile of the object 230 is simultaneously compared to the computer model in real time. The scanned physical parameters and are superimposed onto the computer model parameters and compared. The difference between the physical object 230 and the computer model at each designated profile location is a delta point.

The values of the delta points between the physical model and the computer model are calculated by the imaging system 210 and sent to the computing device 215. The computing device 215 then adjusts one or more of the first robotic arm 220, the second robotic arm 225, and a pin assembly (as shown in FIG. 3) to adjust either the placement of the material (as in FIG. 2) or additional deformation of the material (as shown below in FIG. 3) to better match the object 230 to the computer model.

Figure 3:
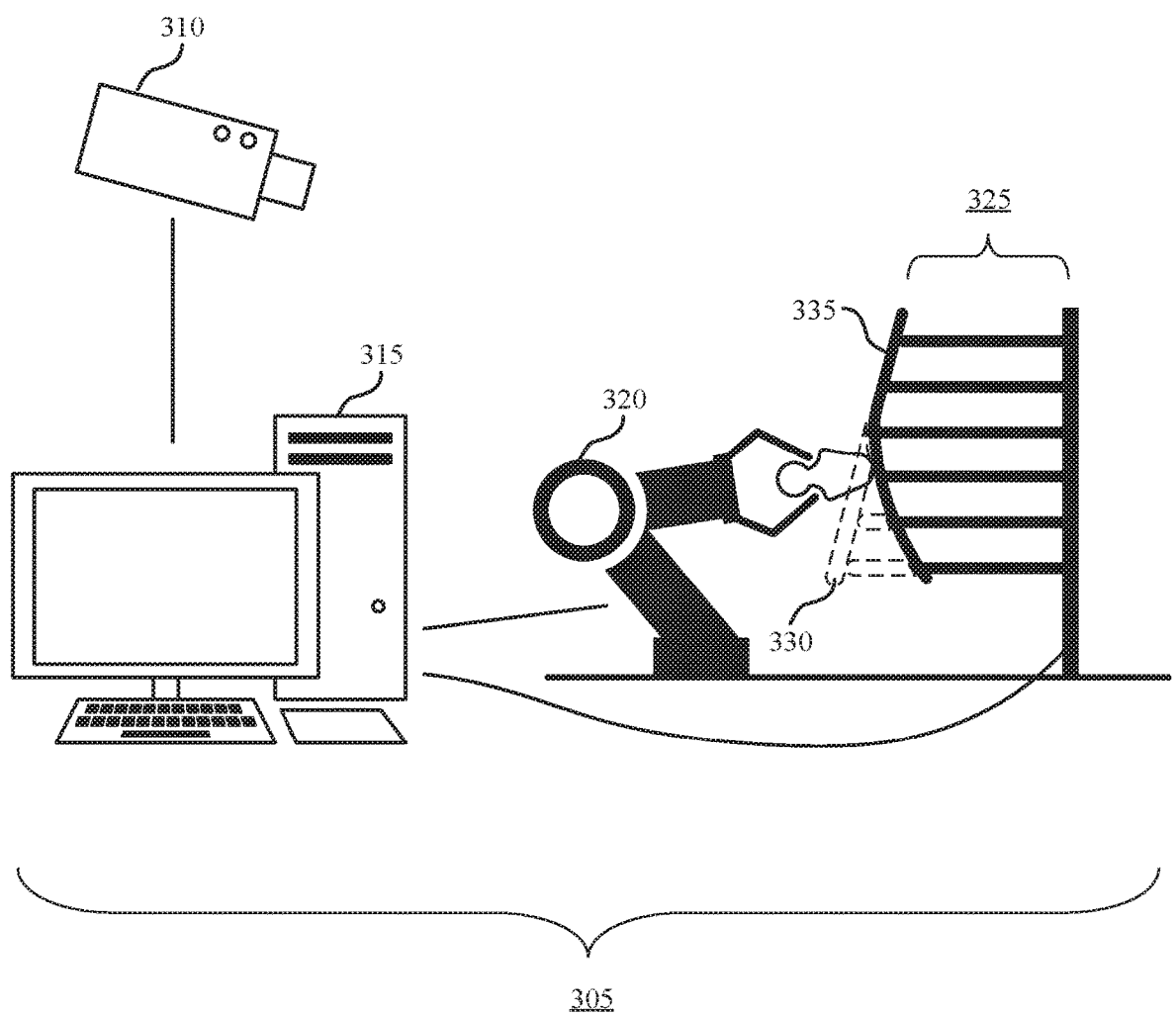
FIG. 3 illustrates an example of a manufacturing system with a pin assembly that supports automated manufacturing of thermoplastic parts in accordance with aspects of the present disclosure.

FIG. 3 illustrates an example of a manufacturing system 305 with a pin assembly 325 that supports automated manufacturing of thermoplastic parts in accordance with aspects of the present disclosure. FIG. 3 includes illustrations of manufacturing system 305 and object 335.

Manufacturing system 305 may be an example of, or incorporate aspects of, manufacturing system 105, 205, and 405 as described with reference to FIGS. 1, 2, and 4. In some examples, manufacturing system 305 may include imaging system 310, computing device 315, first robotic arm 320, pin assembly 325, and shaped location 330.

Imaging system 310 may be an example of, or incorporate aspects of, imaging system 110, 210, and 410 as described with reference to FIGS. 1, 2, and 4.

Computing device 315 may be an example of, or incorporate aspects of, computing device 130, 215, and 415 as described with reference to FIGS. 1, 2, and 4.

First robotic arm 320 may be an example of, or incorporate aspects of, first robotic arm 140, 220, 420, 505, and 605 as described with reference to FIGS. 1, 2, 4, 5, and 6.

Pin assembly 325 may be an example of, or incorporate aspects of, pin assembly 160 and 425 as described with reference to FIGS. 1 and 4.

Object 335 may be an example of, or incorporate aspects of, object 230, 430, 535 and 635 as described with reference to FIGS. 2, 4, 5, and 6.

After the initial placement phase, the moveable pin assembly 325 may be used to assist the second robotic arm. The pin assembly 325 is another embodiment of the support apparatus for the dispensed thermoplastic material. The pin assembly 325 provides support for the growing object 335 as well as being configured to deform the object 335 as required to match the object 335 to the object 335 computer model.

In one embodiment, the pin assembly 325 comprises a plurality of pins coupled and extending outward from a support structure. The pins are configured to move at least outward and inward with respect to a support structure (i.e. in a horizontal plane in FIG. 2), as shown by the differing pin lengths in FIG. 3.

In other embodiments the pin assembly 325 may be configured with the pins moving in additional directions, such as vertically. In some embodiments the pin assembly 325 is configured to provide three-dimensional support. Each pin includes a vacuum cup or other clamping device to provide removable attachment to the object 335 at the end of each pin.

In some embodiments the cups/clamping devices are rotatable about X/Y/Z axes. The pin assembly 325 is coupled to the and controlled by the computing device 315. The pins can work independently or in concert as needed and can also retract to give clearance to other elements (e.g. the robotic arms) as lamination progresses.

In another embodiment, in lieu of the pin assembly 325 a truss picture frame structure is used to provide surfaces for supporting and forming the object 335. The truss picture frame may be constructed from metal or composite material with the lightest weight yet maximum stiffness. The truss picture frame is configured to provide a surface where the first robotic arm 320 starts and/or stops the layup of the object 335.

The truss picture frame may be outside of the object parameters and can be reused for each instance of a specific object 335. The truss picture frame may also be configured to aid in defining the 3D space for the scanner system by having at least 3 points identified in three-dimensional space. The truss picture frame may also be used during a trim operation as a holding fixture.

Once the initial placement phase is complete, the pin assembly 325 provides for adjustment of the portion of the object 335 already completed while still allowing for placement of the rest of the object 335. As shown in FIG. 3, the bottom portion of the object 335 has been deformed by the pin assembly 325 from the FIG. 2 shape by the pin assembly 325 to the shape shown in FIG. 3. The deformation is accomplished by coupling the cups or clamps to the object 335, and moving/rotating the pins. The object 335 follows the movement of the pins to the new location. The degree of deformation of the object 335 may be determined using the data from the imaging system 310, as previously described.

Because the heated composite material cools after placing, the object 335 may incur internal stresses due to temperature differentials in the object 335. To relieve the internal stresses, during placement and adjustment phase heat may be applied to stressed areas. The heat source may be an infrared source applied to the stressed area as required, and in some embodiments the infrared source is attached to the first robotic arm 320 and a second robotic arm. In another embodiment, fuzzy logic coding is included which will allow the first robotic arm 320 to place fibers in different orders to prevent stresses.

Figure 4:
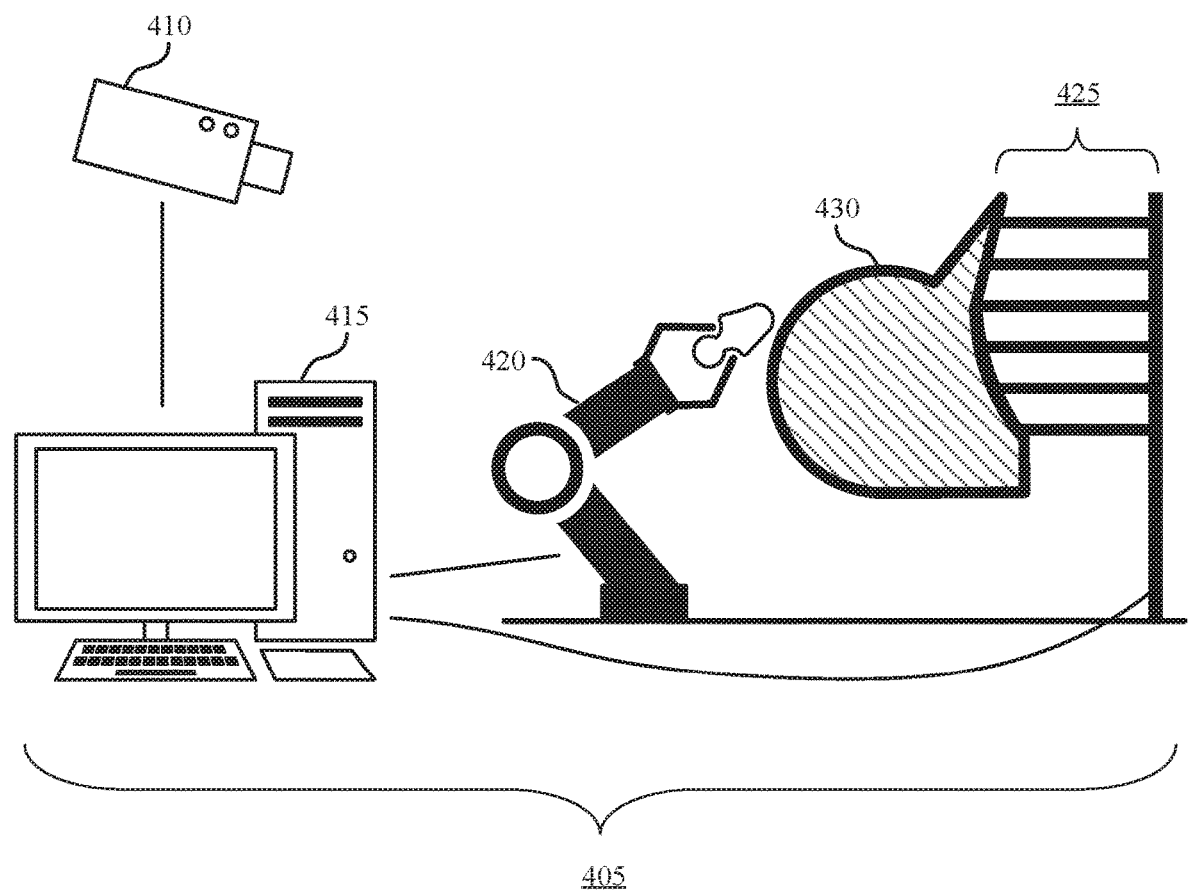
FIG. 4 illustrates an example of a manufacturing system with an object and pin assembly that supports automated manufacturing of thermoplastic parts in accordance with aspects of the present disclosure.

FIG. 4 illustrates an example of a manufacturing system 405 with an object 430 and pin assembly 425 that supports automated manufacturing of thermoplastic parts in accordance with aspects of the present disclosure. FIG. 4 includes illustrations of manufacturing system 405 and object 430.

Manufacturing system 405 may be an example of, or incorporate aspects of, manufacturing system 105, 205, and 305 as described with reference to FIGS. 1, 2, and 3. In some examples, manufacturing system 405 may include imaging system 410, computing device 415, first robotic arm 420, and pin assembly 425.

Imaging system 410 may be an example of, or incorporate aspects of, imaging system 110, 210, and 310 as described with reference to FIGS. 1, 2, and 3.

Computing device 415 may be an example of, or incorporate aspects of, computing device 130, 215, and 315 as described with reference to FIGS. 1, 2, and 3.

First robotic arm 420 may be an example of, or incorporate aspects of, first robotic arm 140, 220, 320, 505, and 605 as described with reference to FIGS. 1, 2, 3, 5, and 6.

Pin assembly 425 may be an example of, or incorporate aspects of, pin assembly 160 and 325 as described with reference to FIGS. 1 and 3.

Object 430 may be an example of, or incorporate aspects of, object 230, 335, 535 and 635 as described with reference to FIGS. 2, 3, 5 and 6.

As more material and features are added to the object 430, the computing device 415 continues to continuously receive the 3-D scan data from the imaging system 410, compare the scan data to the engineering model, and send commands to one or more of the system components to correct any differences. Stress-relieving as previously described may also conducted during this phase. The object 430 is finished when the object 430 is complete and is built within predetermined engineering tolerances. At this point, an inspection report is generated, through the scanner, to document the "as built" condition.

Figure 5:
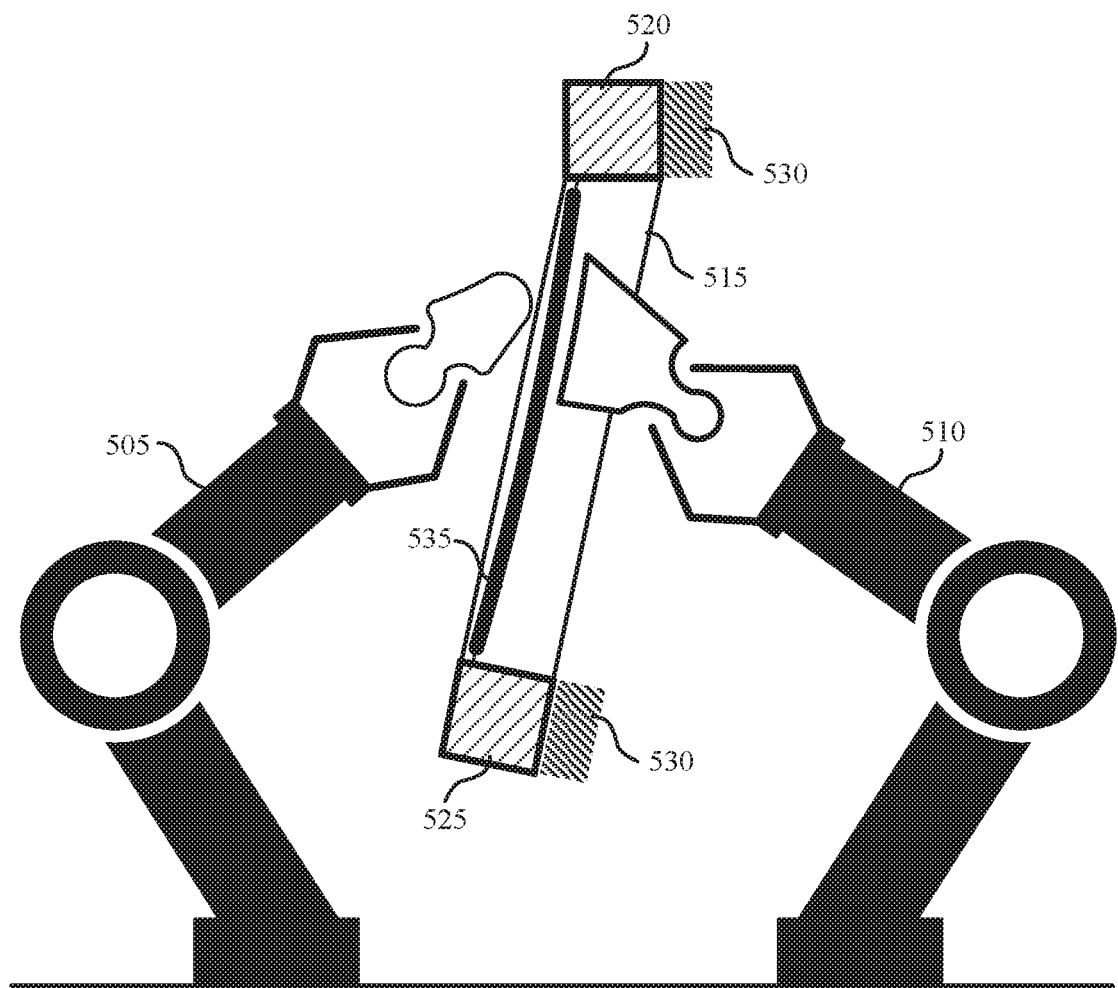
FIG. 5 illustrates an example of a manufacturing system with a fixed support that supports automated manufacturing of thermoplastic parts in accordance with aspects of the present disclosure.

FIG. 5 illustrates an example of a manufacturing system with a fixed support 530 that supports automated manufacturing of thermoplastic parts in accordance with aspects of the present disclosure. FIG. 5 includes illustrations of first robotic arm 505, second robotic arm 510, picture frame 515, top rung 520, bottom rung 525, and fixed support 530.

First robotic arm 505 may be an example of, or incorporate aspects of, first robotic arm 140, 220, 320, 420, and 605 as described with reference to FIGS. 1, 2, 3, 4, and 6.

Second robotic arm 510 may be an example of, or incorporate aspects of, second robotic arm 150, 225, and 610 as described with reference to FIGS. 1, 2, and 6.

Picture frame 515 may be an example of, or incorporate aspects of, picture frame 615 as described with reference to FIG. 6.

Top rung 520 may be an example of, or incorporate aspects of, top rung 620 as described with reference to FIG. 6.

Bottom rung 525 may be an example of, or incorporate aspects of, bottom rung 625 as described with reference to FIG. 6.

Object 535 may be an example of, or incorporate aspects of, object 230, 335, 430, and 635 as described with reference to FIGS. 2, 3, 4 and 6.

In lieu of the pin assembly, a truss picture frame 515 structure may used to provide surfaces for supporting and forming the object. A cross-section is shown through the truss picture frame 515 and object such that the two rungs are shown in cross-section and one rail is shown in elevation.

Generally, the truss picture frame 515 may be an open rectangular shape, with two generally vertical rails (as the truss picture frame 515 is shown in cross-section, only one rail is shown) coupled to two generally horizontal rungs (a top rung 520 and a bottom rung 525) to form the open rectangular shape. The truss picture frame 515 is supported in a fixed position by one or more fixed supports 530. The fixed supports 530 are configured to hold the truss picture frame 515 in the desired, generally unmoving, position during object formation.

The orientation of the truss picture frame 515 is angled slightly from vertical. The truss picture frame 515 may be oriented in any position required to provide perimeter support to the object. The truss picture frame 515 may be constructed from metal or composite material with the lightest weight yet maximum stiffness. The truss picture frame 515 is configured to provide a surface/support point where the first robotic arm 505 starts and/or stops the layup of the object. The truss picture frame 515 is located outside of the object parameters and can be reused for each instance of a specific object. The truss picture frame 515 is also configured to aid in defining the 3D space for the scanner system by having at least 3 points identified by the system in three-dimensional space. The truss picture frame 515 may also be used during a trim operation as a holding fixture.

In operation, initially and/or during placement of the object, the truss picture frame 515 provides perimeter support points for the object. The first robotic arm 505 dispenses one or more portions of the thermoplastic material onto the truss picture frame 515, whereby the portion of the thermoplastic material supported by the picture frame 515 supports the object as a whole. In some embodiments, the truss picture frame 515 can be used as the object support without the second robotic arm 510.

Figure 6:
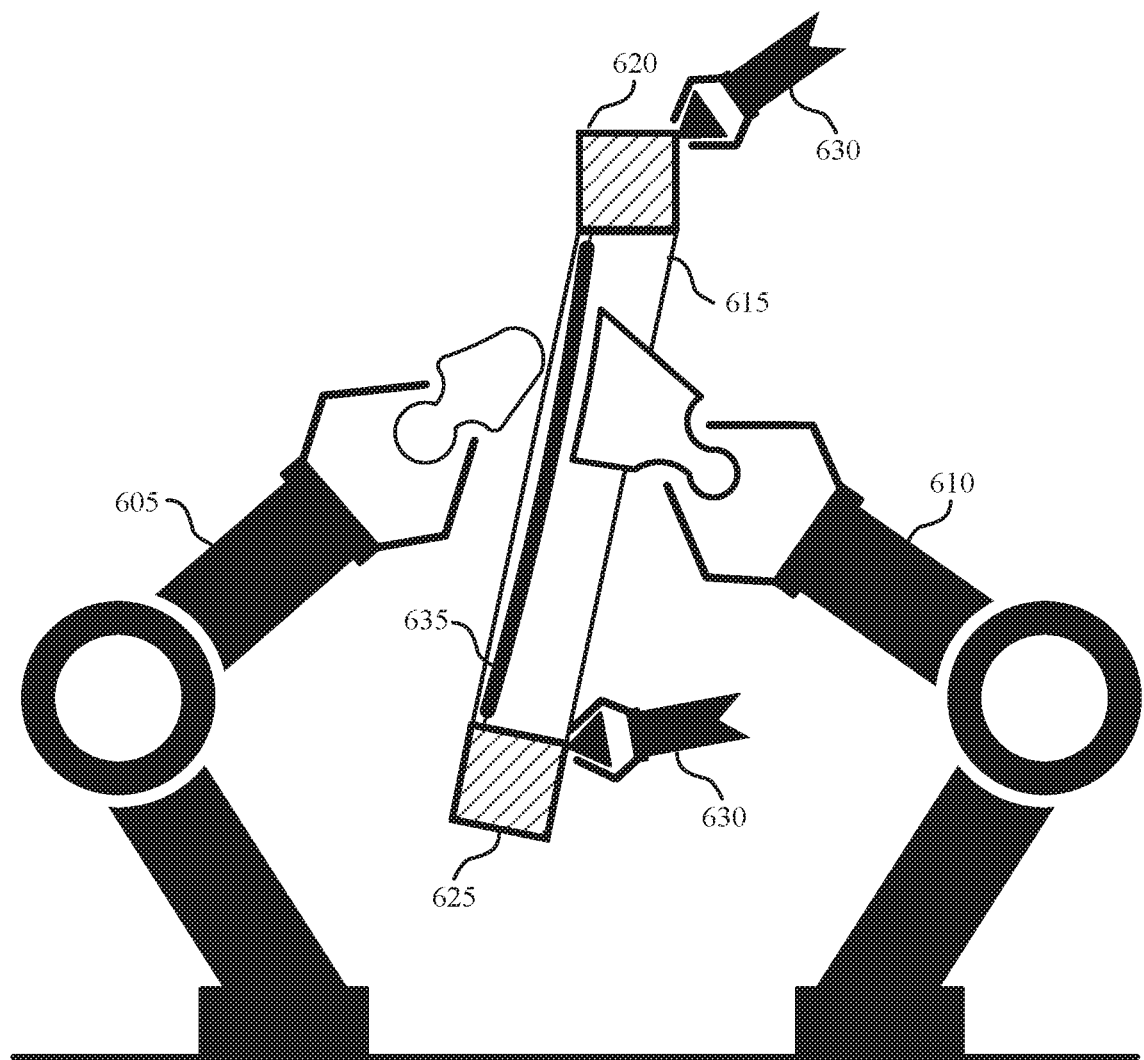
FIG. 6 illustrates an example of a manufacturing system with a positionable support that supports automated manufacturing of thermoplastic parts in accordance with aspects of the present disclosure.

FIG. 6 illustrates an example of a manufacturing system with a positionable support that supports automated manufacturing of thermoplastic parts in accordance with aspects of the present disclosure. FIG. 6 includes illustrations of first robotic arm 605, second robotic arm 610, picture frame 615, top rung 620, bottom rung 625, and positionable support 630.

First robotic arm 605 may be an example of, or incorporate aspects of, first robotic arm 140, 220, 320, 420, and 505 as described with reference to FIGS. 1, 2, 3, 4, and 5.

Second robotic arm 610 may be an example of, or incorporate aspects of, second robotic arm 150, 225, and 510 as described with reference to FIGS. 1, 2, and 5.

Picture frame 615 may be an example of, or incorporate aspects of, picture frame 515 as described with reference to FIG. 5.

Top rung 620 may be an example of, or incorporate aspects of, top rung 520 as described with reference to FIG. 5.

Bottom rung 625 may be an example of, or incorporate aspects of, bottom rung 525 as described with reference to FIG. 5.

Object 630 may be an example of, or incorporate aspects of, object 230, 335, 430 and 535 as described with reference to FIGS. 2, 3, 4, and 5.

The embodiment of FIG. 6 is similar to FIG. 5 with the exception of the positionable supports in lieu of the fixed supports. The one or more positionable supports are configured to provide mobility in 1, 2 or 3 dimensions during the object manufacture.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

Figure 7:
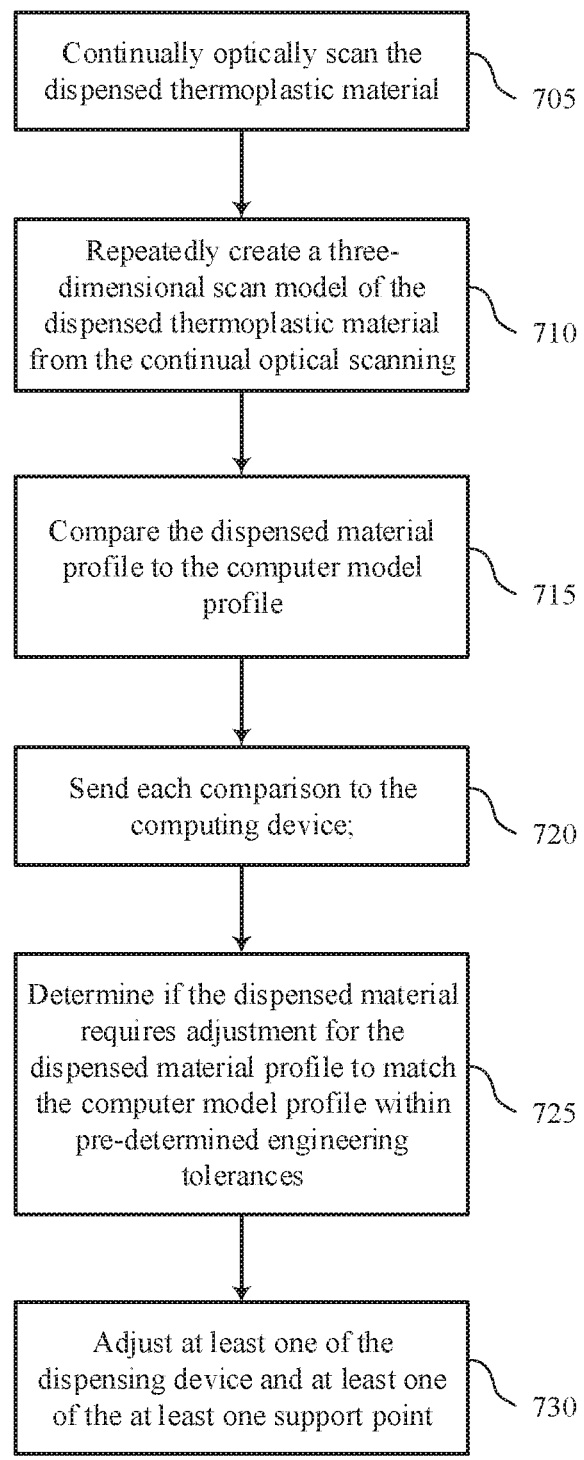
FIGS. 7 through 10 illustrate examples of processes performed by a manufacturing system for automated manufacturing of thermoplastic parts in accordance with aspects of the present disclosure.

FIG. 7 illustrates an example of a process performed by a manufacturing system for automated manufacturing of thermoplastic parts in accordance with aspects of the present disclosure. In some examples, a manufacturing system may execute a set of codes to control functional elements of the manufacturing system to perform the described functions.

Additionally or alternatively, a manufacturing system may use special-purpose hardware. These operations may be performed according to the methods and processes described in accordance with aspects of the present disclosure. For example, the operations may be composed of various sub-steps, or may be performed in conjunction with other operations described herein.

At block 705 the manufacturing system may continually optically scan the dispensed thermoplastic material. In certain examples, aspects of the described operations may be performed by imaging system 110, 210, 310, and 410 as described with reference to FIGS. 1, 2, 3, and 4.

At block 710 the manufacturing system may repeatedly create a three-dimensional scan model of the dispensed thermoplastic material from the continual optical scanning, the scan model including a three-dimensional dispensed material profile. In certain examples, aspects of the described operations may be performed by modeling component 120 as described with reference to FIG. 1.

At block 715 the manufacturing system may compare, after the creation of each scan model, the dispensed material profile to the computer model profile. In certain examples, aspects of the described operations may be performed by comparison component 125 as described with reference to FIG. 1.

At block 720 the manufacturing system may send each comparison to the computing device. In certain examples, aspects of the described operations may be performed by comparison component 125 as described with reference to FIG. 1.

At block 725 the manufacturing system may determine, after the creation of each scan model, if the dispensed material requires adjustment for the dispensed material profile to match the computer model profile within pre-determined engineering tolerances. In certain examples, aspects of the described operations may be performed by computing device 130, 215, 315, and 415 as described with reference to FIGS. 1, 2, 3, and 4.

At block 730 the manufacturing system may adjust upon determining that the dispensed material requires adjustment, at least one of the dispensing device and at least one of the at least one support point, whereby the dispensed material profile is adjusted to match the computer model profile within the pre-determined engineering tolerances. In certain examples, aspects of the described operations may be performed by computing device 130, 215, 315, and 415 as described with reference to FIGS. 1, 2, 3, and 4.

Figure 8:
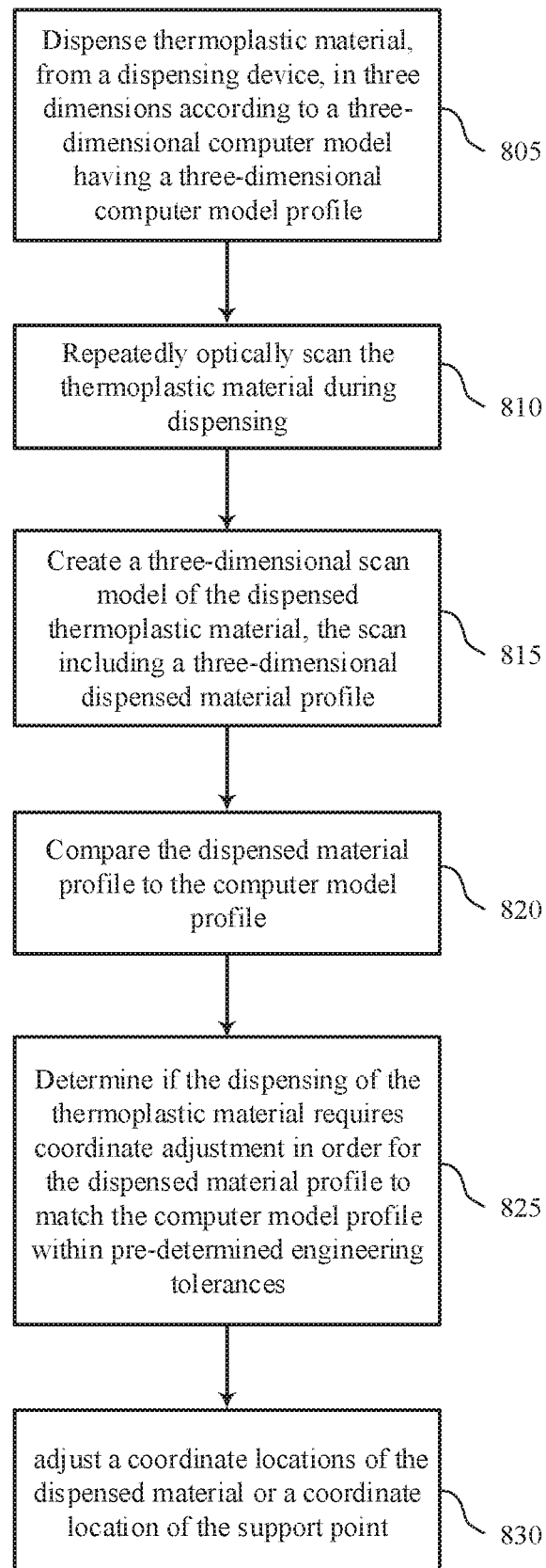

FIG. 8 illustrates an example of a process performed by a manufacturing system for automated manufacturing of thermoplastic parts in accordance with aspects of the present disclosure. In some examples, a manufacturing system may execute a set of codes to control functional elements of the manufacturing system to perform the described functions.

Additionally or alternatively, a manufacturing system may use special-purpose hardware. These operations may be performed according to the methods and processes described in accordance with aspects of the present disclosure. For example, the operations may be composed of various substeps, or may be performed in conjunction with other operations described herein.

At block 805 the manufacturing system may dispense thermoplastic material, from a dispensing device, in three dimensions according to a three-dimensional computer model having a three-dimensional computer model profile, wherein the dispensed thermoplastic material is supported by at least one support point of a support apparatus. In certain examples, aspects of the described operations may be performed by a dispensing device as described above.

At block 810 the manufacturing system may repeatedly optically scan the thermoplastic material during dispensing. In certain examples, aspects of the described operations may be performed by imaging system 110, 210, 310, and 410 as described with reference to FIGS. 1, 2, 3, and 4.

At block 815 the manufacturing system may create, after each scan, a three-dimensional scan model of the dispensed thermoplastic material, the scan including a three-dimensional dispensed material profile. In certain examples, aspects of the described operations may be performed by modeling component 120 as described with reference to FIG. 1.

At block 820 the manufacturing system may compare, after each scan, the dispensed material profile to the computer model profile. In certain examples, aspects of the described operations may be performed by comparison component 125 as described with reference to FIG. 1.

At block 825 the manufacturing system may determine, after each scan, if the dispensing of the thermoplastic material requires coordinate adjustment in order for the dispensed material profile to match the computer model profile within pre-determined engineering tolerances. In certain examples, aspects of the described operations may be performed by computing device 130, 215, 315, and 415 as described with reference to FIGS. 1, 2, 3, and 4.

At block 830 the manufacturing system may adjust, upon determining that the dispensed material requires adjustment, of at least one of the coordinate location of the dispensed material and the coordinate location of the support point, whereby the dispensed material profile is adjusted to match the computer model profile within a pre-determined tolerance. In certain examples, aspects of the described operations may be performed by computing device 130, 215, 315, and 415 as described with reference to FIGS. 1, 2, 3, and 4.

Figure 9:
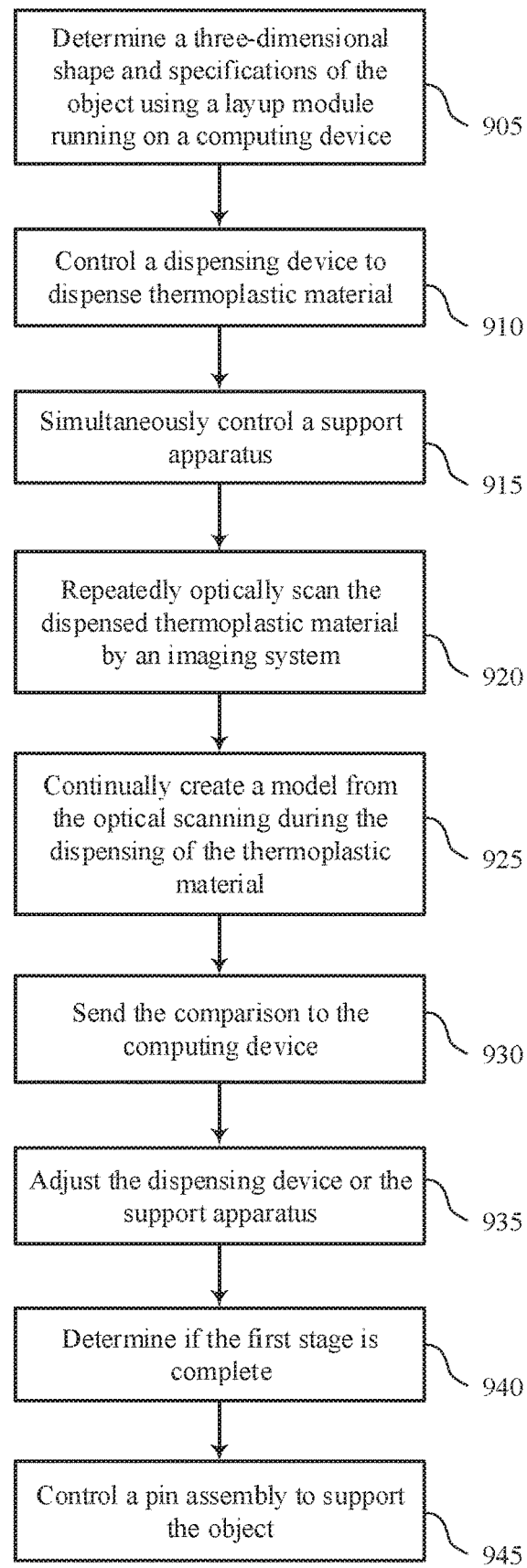

FIG. 9 illustrates an example of a process performed by a manufacturing system for automated manufacturing of thermoplastic parts in accordance with aspects of the present disclosure. In some examples, a manufacturing system may execute a set of codes to control functional elements of the manufacturing system to perform the described functions.

Additionally or alternatively, a manufacturing system may use special-purpose hardware. These operations may be performed according to the methods and processes described in accordance with aspects of the present disclosure. For example, the operations may be composed of various substeps, or may be performed in conjunction with other operations described herein.

At block 905 the manufacturing system may determine a three-dimensional shape and specifications of the object using a layup module running on a computing device. In certain examples, aspects of the described operations may be performed by computing device 130, 215, 315, and 415 as described with reference to FIGS. 1, 2, 3, and 4.

At block 910 the manufacturing system may control a dispensing device to dispense thermoplastic material, whereby the dispensing device dispenses the material in three dimensions to create the object. In certain examples, aspects of the described operations may be performed by computing device 130, 215, 315, and 415 as described with reference to FIGS. 1, 2, 3, and 4.

At block 915 the manufacturing system may simultaneously control, during a first stage of dispensing of the thermoplastic material, a support apparatus, whereby the support apparatus is moveable in three dimensions to support the dispensed material. In certain examples, aspects of the described operations may be performed by computing device 130, 215, 315, and 415 as described with reference to FIGS. 1, 2, 3, and 4.

At block 920 the manufacturing system may repeatedly optically scan the dispensed thermoplastic material by an imaging system during dispensing of the thermoplastic material. In certain examples, aspects of the described operations may be performed by imaging system 110, 210, 310, and 410 as described with reference to FIGS. 1, 2, 3, and 4.

At block 925 the manufacturing system may continually create a model from the optical scanning during the dispensing of the thermoplastic material. In certain examples, aspects of the described operations may be performed by modeling component 120 as described with reference to FIG. 1.

At block 930 the manufacturing system may send the comparison to the computing device. In certain examples, aspects of the described operations may be performed by modeling component 120 as described with reference to FIG. 1.

At block 935 the manufacturing system may adjust, in response to each comparing during the first stage, of at least one of the dispensing device and the support apparatus. In certain examples, aspects of the described operations may be performed by computing device 130, 215, 315, and 415 as described with reference to FIGS. 1, 2, 3, and 4.

At block 940 the manufacturing system may determine if the first stage is complete. In certain examples, aspects of the described operations may be performed by computing device 130, 215, 315, and 415 as described with reference to FIGS. 1, 2, 3, and 4.

At block 945 the manufacturing system may control in response to determining that the first stage is complete, of a pin assembly to support the object. In certain examples, aspects of the described operations may be performed by computing device 130, 215, 315, and 415 as described with reference to FIGS. 1, 2, 3, and 4.

Figure 10:
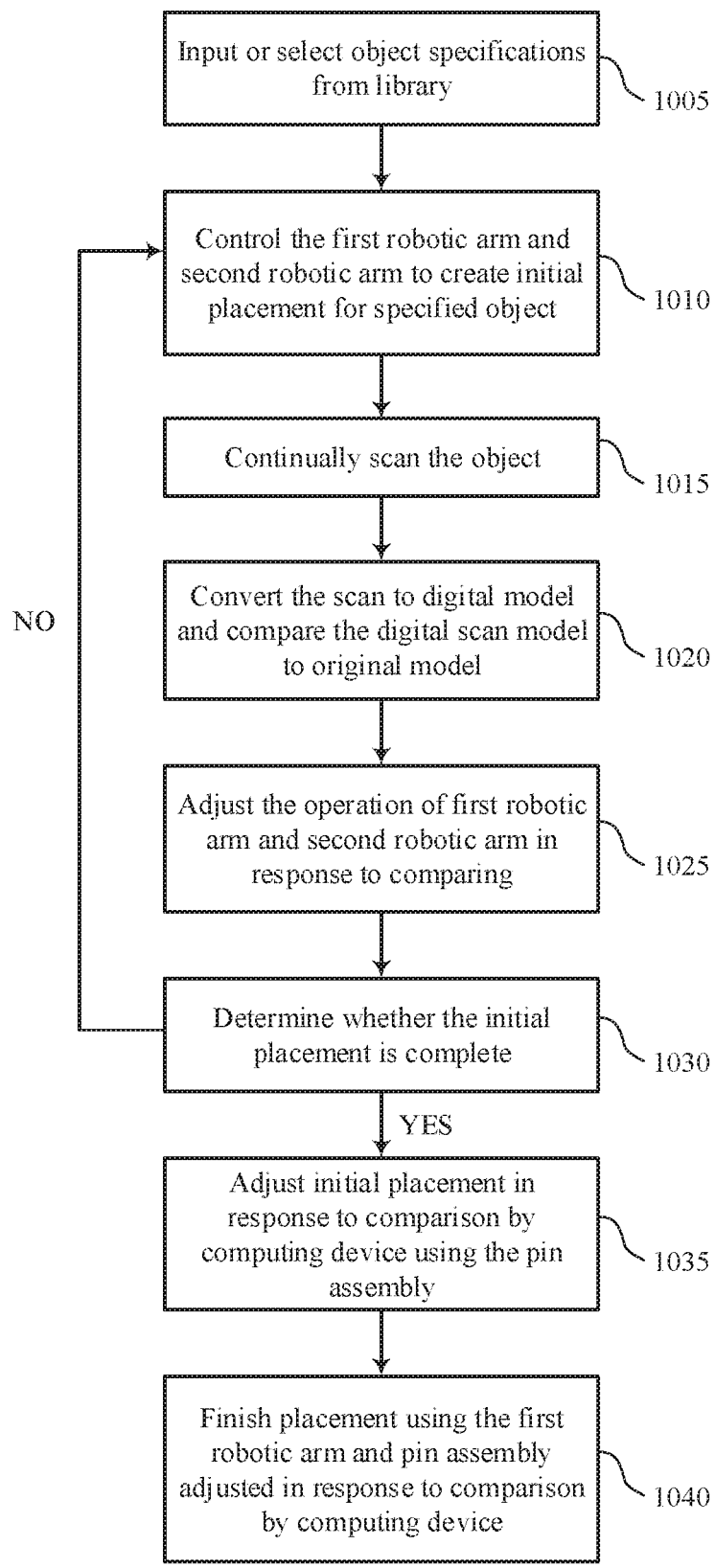

FIG. 10 illustrates an example of a process performed by a manufacturing system for automated manufacturing of thermoplastic parts in accordance with aspects of the present disclosure. In some examples, a manufacturing system may execute a set of codes to control functional elements of the manufacturing system to perform the described functions.

Additionally or alternatively, a manufacturing system may use special-purpose hardware. These operations may be performed according to the methods and processes described in accordance with aspects of the present disclosure. For example, the operations may be composed of various sub-steps, or may be performed in conjunction with other operations described herein.

At block 1005 the manufacturing system may input or select object specifications from library. In certain examples, aspects of the described operations may be performed by manufacturing system 105, 205, 305, and 405 as described with reference to FIGS. 1, 2, 3, and 4.

The desired object specifications may be first input or selected via the layup module of the computing device. The specifications may be imported from another program or a library. The specifications include the three-dimensional shape of the object. The specifications may include other object information, such as type of material and material placement specifications. Engineering tolerances may be included in the object specifications or may be pre-selected.

At block 1010 the manufacturing system may control the first robotic arm and second robotic arm to create initial placement for specified object. In certain examples, aspects of the described operations may be performed by manufacturing system 105, 205, 305, and 405 as described with reference to FIGS. 1, 2, 3, and 4.

Using the selected object specifications the computing device controls the first robotic arm (to output the material) and the second robotic arm (to provide support for the placing of the material) to place the initial layers of the object, as shown above in FIG. 2.

At block 1015 the manufacturing system may continually scan the object. In certain examples, aspects of the described operations may be performed by imaging system 110, 210, 310, and 410 as described with reference to FIGS. 1, 2, 3, and 4.

The optical scanner of the imaging system continually scans the object. In some embodiments the scan is a continuous scan, e.g. a video. In other embodiments the scanner takes a photo of the object at regular intervals.

At block 1020 the manufacturing system may convert the scan to digital model and compares digital scan model to original model. In certain examples, aspects of the described operations may be performed by modeling component 120 as described with reference to FIG. 1.

The RVAT system of the imaging system continually receives the data from the scanner in real time and the system converts the data into a digital model that can be compared with the original model and specifications being used to generate the object. The RVAT system compares the model from the scan with the original model and generates data including differences between the scanned model and the original model at various points on the object surface. The imaging system then sends the data to the computing device.

At block 1025 the manufacturing system may adjust the operation of first robotic arm and second robotic arm in response to comparing. In certain examples, aspects of the described operations may be performed by computing device 130, 215, 315, and 415 as described with reference to FIGS. 1, 2, 3, and 4.

That is, the computing device receives the data regarding the difference between the as-placed material and the original model and adjusts the operation of the first robotic arm and the second robotic arm as required to adjust the as-placed material to match the original model.

At block 1030 the manufacturing system may determine whether the placement is complete. In certain examples, aspects of the described operations may be performed by computing device 130, 215, 315, and 415 as described with reference to FIGS. 1, 2, 3, and 4.

If the initial placement of material is complete, and the "anvil support" of the second robotic arm is no longer required, the method proceeds to the next pin apparatus support step. In some embodiments the initial placement may be the entire placement and the method is finished after this step and the object is complete.

If the initial placement is not complete, the method returns to the second step and the process of scanning the object and adjusting the robotic arms continues.

At block 1035 the manufacturing system may adjust initial placement in response to comparison by computing device using the pin assembly. In certain examples, aspects of the described operations may be performed by computing device 130, 215, 315, and 415 as described with reference to FIGS. 1, 2, 3, and 4.

That is, if the initial placement is complete and the process proceeds to the seventh pin assembly step, in lieu of the second robotic arm the pin assembly is used to support the object, as shown in FIG. 3. The pin assembly also receives instruction from the computing device, and is moveable to adjust the object to match the computer model. The imaging system continues to scan the object and provide the data to the computing device in real time.

At block 1040 the manufacturing system may finish placement using the first robotic arm and pin assembly adjusted in response to comparison by computing device. In certain examples, aspects of the described operations may be performed by manufacturing system 105, 205, 305, and 405 as described with reference to FIGS. 1, 2, 3, and 4.

Thus, the remainder of material is placed according to the ongoing scans and subsequent adjustments by the first robotic arm and the pin assembly in response to the continual scanning and comparison. It will be understood that stress-relieving of the object may occur at any point during the process as required. In some embodiments, the imaging system takes a final scan, compares it to the original model, and sends it to the computing device. The computing device performs a quality check of the object and determines whether the final object as-built specifications fall within acceptable parameters.

In another embodiment of the present invention, in lieu of the first robotic arm dispensing the material full sheets of single ply thermoplastic material or sheet metal are used to create the object. The first robotic arm and the second robotic arms are configured to perform as an English Wheel, with one robotic arm configured to provide the upper anvil wheel and the other robotic arm configured to provide the lower anvil wheel. The shape of the object is them formed by the sheet shape being pressed between the two anvil wheels. Additional material sheets may then be bonded to the initial sheet through the process of pressure and temperature induced through the rollers.

The systems and processes described herein provide a path for smooth transitioning from prototype to low rate initial production (LRIP) by delaying or reducing the total quantity of high cost tooling. The process provides shortened manufacturing flows early in the product life cycle where it is most essential to design optimization, and supports early entry into the formal production cycle by assuring a mature, stable Bill of Material. The systems and processes also provides automated generation of reference surfaces normally provided by expensive tooling. Additionally, design and manufacturing are performed concurrently, in lieu of having to send out the manufacturing to a remote location for cost-efficient production.

The processes may be used to create a wide range of products including, but not limited to, aircraft, spacecraft, automotive, marine vehicles, and wind blades.

Some of the functional units described in this specification have been labeled as modules, or components, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A method for manufacturing thermoplastics, comprising:
dispensing thermoplastic material, from a dispensing device, in three dimensions according to a three-dimensional computer model having a three-dimensional computer model profile, wherein the dispensed thermoplastic material is supported by at least one support point of a support apparatus;
repeatedly optically scanning the thermoplastic material during dispensing;
creating, after each scan, a three-dimensional scan model of the dispensed thermoplastic material, the scan including a three-dimensional dispensed material profile;
comparing, after each scan, the dispensed material profile to the computer model profile;
determining, after each scan, if the dispensed thermoplastic material requires coordinate adjustment in order for the dispensed material profile to match the computer model profile within pre-determined engineering tolerances; and
adjusting, upon determining that the dispensed material requires adjustment, of at least one of the coordinate location of the dispensed material and the coordinate location of the support point, whereby the dispensed material is deformed, whereby the dispensed material profile is adjusted to match the computer model profile within a pre-determined tolerance.

2. The method of claim 1, wherein:
the three-dimensional computer model profile is generated by a layup module configured to run on a computing device, wherein the computing device is configured to control the dispensing device.

3. The method of claim 1, wherein:
the dispensing device is a first robotic arm configured to dispense the thermoplastic material from a free end of the robotic arm.

4. The method of claim 1, wherein:
the comparing of the dispensed material profile to the computer model profile includes identifying a plurality of designated profile locations on the computer model profile and corresponding profile locations on the dispensed material profile, wherein each designated profile location is compared to the corresponding dispensed material profile location.

5. The method of claim 4, wherein:
the comparison of each designated profile location with the corresponding dispensed material profile location is a delta point, wherein the delta point indicates a coordinate distance between the designated profile location and the corresponding dispensed material profile location.

6. The method of claim 1, wherein:
the support apparatus comprises a support robotic arm with a free end configured to move in three-dimensional space, wherein the support robotic arm is coordinated with the dispensing device, whereby the at least one support point is repeatedly moved such that the support point is maintained in a location relative to the dispensed thermoplastic material to produce the object with the computer model three-dimensional profile.

7. The method of claim 6, wherein:
the free end of the support robotic arm includes a support surface, wherein the at least one support point of the support apparatus is included in the support surface.

8. The method of claim 7, wherein:
the support surface is configured to provide a mold for the thermoplastic object.

9. The method of claim 6, wherein:
the support robotic arm is coupled to a track such that the support robotic arm is moveable on the track.

10. The method of claim 1, wherein:
the dispensing device is coupled to a track such that the dispensing device is moveable on the track.

11. The method of claim 1, wherein:
the support apparatus comprises a pin assembly comprising a plurality of generally horizontal pins coupled to a fixed support structure, each pin configured to provide at least one of removable support and deformation to the object during manufacture.

12. The method of claim 1, further comprising:
providing a picture frame structure having an open geometric shape and including at least one additional support point for the dispensed thermoplastic material, wherein the at least one support point is located at a position on the dispensed material profile.

13. The method of claim 12, wherein:
the picture frame structure is fixed in place during the object manufacture.

14. The method of claim 12, wherein:
the picture frame structure is moveable during the object manufacture.

15. The method of claim 1, further comprising:
providing a picture frame structure having an open geometric shape and including at least one additional support point for the dispensed thermoplastic material, wherein the at least one support point is located at a position outside the dispensed material profile.

16. The method of claim 1, further comprising:
applying heat to the dispensed thermoplastic material during dispensing the thermoplastic material to create the object, whereby internal stresses of the dispensed thermoplastic material are relieved.

17. The method of claim 1, wherein:
the repeatedly optically scanning the thermoplastic material during dispensing further comprises continually taking photographs.

18. The method of claim 1, wherein:
the repeatedly optically scanning the thermoplastic material during dispensing further comprises continually taking video.

19. The method of claim 1, wherein:
the thermoplastic material is one of polyetheretherketone, polyetherketoneketone, and polyethersulfone.

* * * * *